3,281,454
DERIVATIVES OF GLYCYRRHETINIC ACID
Vernon Askam, Cyncoed, Cardiff, and Harold John Smith, Dinas Powis, Glamorgan, Wales, assignors to Biorex Laboratories Limited, London, England
No Drawing. Filed Mar. 25, 1965, Ser. No. 442,790
Claims priority, application Great Britain, Apr. 6, 1964, 14,052/64
2 Claims. (Cl. 260—468.5)

The present invention is concerned with new derivatives of glycyrrhetinic acid with interesting pharmaceutical properties, with processes for the preparation thereof and with pharmaceutical compositions containing them.

It is an object of the present invention to provide new derivatives of glycyrrhetinic acid which possess unexpectedly useful pharmacological properties and a degree of activity which could not have been predicted from a knowledge of their chemical structure.

The new glycyrrhetinic acid derivatives of the present invention may be represented by the general formulae:

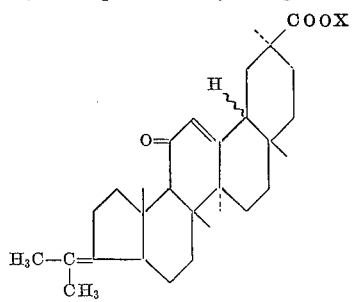
(I)

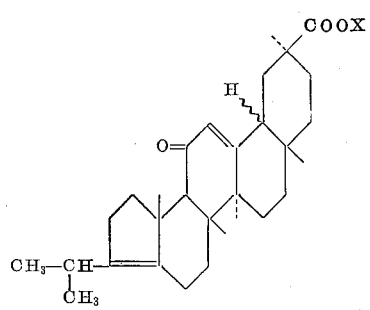
(II)

wherein X is a hydrogen atom or an alkyl radical.

When X is an alkyl radical, it preferably contains up to 6 carbon atoms. Radicals of this type include methyl, ethyl, n-propyl, n-butyl, n-pentyl, isopentyl and n-hexyl radicals.

These new derivatives of glycyrrhetinic acid are obtained when ring A of glycyrrhetinic acid or of an appropriate alkyl ester thereof is contracted to a 5-membered ring. The glycyrrhetinic acid compounds which can be used as starting materials may be represented by the general formula:

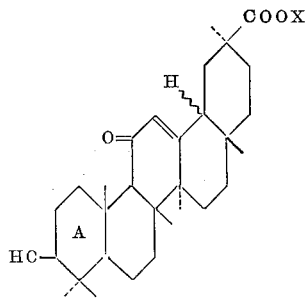
(III)

wherein X is a hydrogen atom or an alkyl radical.

When the starting materials of general Formula III have a free hydroxyl group in the 3-position, the contraction of ring A is carried out with the use of phosphorus pentachloride, preferably in the presence of dry chloroform. The reaction is expediently carried out at a temperature somewhat below room temperature (e.g. 0–10° C.), the phosphorus pentachloride being added with stirring to the solution of the starting material. It is also advantageous to carry out the reaction in the presence of a salt of a weak acid and a strong base, such as sodium acetate. The reaction should preferably be carried out with the exclusion of moisture and, desirably, also with the exclusion of air; this can be achieved by using anhydrous starting materials and passing dry nitrogen through the reaction mixture. After all the phosphorus pentachloride has been added, the reaction mixture is then stirred for some time, again preferably at a temperature below room temperature, the reaction mixture then treated with an excess of an aqueous solution of an alkali metal carbonate or bicarbonate, for example, sodium carbonate or sodium bicarbonate, and subsequently worked up in the usual manner, for example, by crystallisation.

The hydroxyl group in the 3-position of the starting materials of general Formula III can also be converted into a sulphonic ester group, for example, by reaction in pyridine solution, at a temperature somewhat below room temperature, with a sulphonic acid chloride of the general formula $R.SO_2Cl$, wherein R is an alkyl, aryl or alkyl-substituted aryl radical, the preferred acid chlorides being methane-sulphonyl chloride and p-toluene-sulphonyl chloride. The reaction is followed by quenching with ice and water. The sulphonic acid ester can then be filtered off or extracted with suitable organic solvents and purified, for example, by recrystallisation.

The sulphonic acid esters are then dissolved in a suitable solvent and heated with an alkaline material, such as calcium carbonate, or with a salt of a weak acid and a strong base, such as sodium acetate. The reaction mixture obtained contains, as the main component, compounds of general Formula I, together with a lesser amount of compounds of the general Formula II. The components can be separated, for example, by crystallisation.

The following examples are given for the purpose of illustrating the present invention:

Example 1.—*Preparation of the 3-(p-toluene-sulphonate) of 18β-glycyrrhetinic acid methyl ester*

7.1 g. 18β-glycyrrhetinic acid methyl ester were dissolved in 100 ml. pyridine which had been dried by refluxing over and distilling from potassium hydroxide pellets. The mixture was cooled in an ice bath and 19.6 g. p-toluene-sulphonyl chloride added thereto. The solution, in a flask provided with a calcium chloride tube for the exclusion of moisture, was left in an ice bath for 48 hours; the ice was not replaced when it melted. The solution was then poured onto crushed ice and diluted with 1.5 litres water. The suspension was stirred and filtered and the product obtained then dried and crystallised from petroleum ether (B.P. 100–120° C.), using about 550 ml. for 2–3 g. of solid and decanting the hot solution from insoluble oily matter. The mother liquors were used to re-extract this insoluble matter. The petroleum ether solution was left in a refrigerator to crystallise. Yield: 88% of theory. The compound can also be recrystallised from methanol.

The 3-(p-toluene-sulphonate) of 18β-glycyrrhetinic acid methyl ester melts at 142° C., with decomposition; $[\alpha]_D^{20}=110.4°$ (c.=2% in chloroform).

*Analysis.*—$C_{38}H_{54}O_6S$ (M.W. 638): calc.: C, 71.45%; H, 8.5%; S, 5.0%. Found: C, 71.4%; H, 8.5%; S, 4.9%.

*Example 2*

The process according to Example 1 was repeated and the crude p-toluene-sulphonate obtained recrystallised from methanol, using about 180 ml. methanol per gram of crude material. The product obtained melted at 144–145° C.; $[\alpha]_D^{20}=110.4°$ (c.=2% in chloroform). About half of the crude product is lost in recrystallisation but further crops of crystals can be obtained from the mother liquor.

*Example 3.—Rearrangement of the 3-(p-toluene-sulphonate) of 18β-glycyrrhetinic acid methyl ester*

2.2 g. of the 3-(p-toluene-sulphonate) of 18β-glycyrrhetinic acid methyl ester and 1.19 g. anhydrous sodium acetate were dissolved in 285 ml. glacial acetic acid and the solution placed in a flask provided with a condenser and heated at 90–95° C. for 6 hours. The volume of the solution was reduced to about 50 ml. by distilling off acetic acid at water pump vacuum and the remaining solution poured into 350 ml. water. Sodium chloride was then dissolved in this solution and the solution extracted with ether. The ethereal solution was washed with a solution of sodium bicarbonate and with water and dried over anhydrous sodium sulphate. The ether was distilled off leaving 1.7 g. of a residue which melted at 177–195° C.

The residue was extracted by refluxing with 40 ml. petroleum ether (B.P. 60–80° C.). The petroleum ether was distilled off and the residue recrystallised from 160 ml. methanol to give 0.69 g. of white crystals with a melting point of 196.5–201° C., which after further recrystallisation from 82 ml. methanol gave 0.44 g. of crystals of methyl 11-oxo-18β-A-neo-oleana-3,12-diene-30-oate (i.e. a compound of general Formula I in which X is a methyl radical) with a melting point of 204–207° C.

*Analysis.*—$C_{31}H_{46}O_3$ (M.W. 466): calc.: C, 79.75%; H, 9.94%. Found: C, 80.52%; H, 9.98%.

*Example 4.—Rearrangement of 18β-glycyrrhetinic acid methyl ester with phosphorus pentachloride*

693 g. 18β-glycyrrhetinic acid methyl ester ware dissolved in 520 ml. alcohol-free chloroform (prepared by the method described by Vogel, Practical Organic Chemistry, 1951, p. 174, section 25(b)). The solution was placed in a flask fitted with a two-way adaptor and a mechanical stirrer and cooled, while stirring, in an ice bath to a temperature of 2.5–4° C.; 4.62 g. anhydrous sodium acetate, which had been dried at 100° C., were added and the mixture stirred for a further 10 minutes. 4.62 g. phosphorus pentachloride were added and stirring continued for 37 minutes. 14.4 sodium bicarbonate and 433 ml. water were then added and the mixture stirred for about 4 hours. No more ice was added to the cooling bath during this time.

The chloroform layer was then separated and washed with water until the washings had a pH value of 7. The solution was then dried over anhydrous sodium sulphate and the chloroform distilled off on a water bath under reduced pressure to leave a white solid.

This white solid was dissolved in 34 ml. chloroform in a flask and 266 ml. methanol added, while rotating the flask, so that the product separated in crystalline form. The flask was left to stand for 1 hour and the crystals then filtered off to give 4.4 g. of material with a melting point of 210–217° C. Recrystallisation from 103 ml. ethyl acetate gives 3.3 g. of colourless plates with a melting point of 219.5–221.5° C.; $[\alpha]_D^{20}=205.5°$ (c.=1% in chloroform). The product, which is methyl 11-oxo-18β-A-neo-oleana-3,12-diene-30-oate, was further purified by recrystallising it again from ethyl acetate.

*Analysis.*—$C_{31}H_{46}O_3$ (M.W. 466): calc.: C, 79.75%; H, 9.94%. Found: C, 79.6%; H, 9.71%.

The structure of the product was confirmed by ozonolysis, which gave acetone. Further confirmation was provided by the nuclear magnetic resonance spectrum which showed that the molecule only contained one olefinic proton indicating that the 5-membered ring A could have one of the following structures:

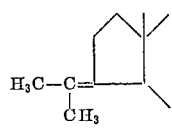 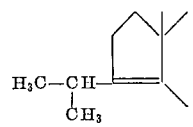

but the formation of acetone by ozonolysis confirms that the first structure must be the one present in the product.

The new glycyrrhetinic acid derivatives of the present invention possess valuable pharmacodynamic properties; in particular, they exhibit an extremely effective anti-inflammatory action.

The present invention also includes within its scope pharmaceutical compositions which comprise one or more of the new compounds according to the present invention or, in the case of those compounds in which X is a hydrogen atom, the salts thereof with pharmaceutically acceptable inorganic or organic bases, together with a significant amount of a pharmaceutical carrier. The invention especially includes such compositions made up for oral or parenteral administration.

Solid compositions for oral administration include compressed tablets, pills, dispersible powders and granules. In such solid compositions one or more of the active compounds of the present invention is or are admixed with at least one inert diluent, such as calcium carbonate, potato starch, alginic acid or lactose. The compositions may also comprise, as is normal practice, additional substances other than inert diluents, for example, lubricating agents, such as magnesium stearate.

Liquid compositions for oral administration include pharmaceutically acceptable emulsions, solutions, suspensions, syrups and elixirs containing inert diluents commonly used in the art, such as water and liquid paraffin; besides inert diluents, such compositions may also comprise adjuvants, such as wetting and suspension agents, and sweetening and flavouring agents.

The compositions according to the invention, for oral administration, include capsules of absorbable material, such as gelatine, containing at least one of the new active compounds of the present invention, with or without the addition of diluents or excipients.

Preparations according to the present invention for parenteral administration include sterile aqueous or non-aqueous solutions, suspensions and emulsions. Examples of non-aqueous solvents or suspending media are propylene glycol, polyethylene glycol, vegetable oil, such as olive oil, and injectable organic esters, such as ethyl oleate. These compositions may also contain adjuvants, such as wetting, emulsifying and dispersing agents. They may be sterilised, for example, by filtration through a bacteria-retaining filter, by incorporation in the compositions of sterilising agents, by irradiation or by heating. They may also be produced in the form of sterile solid compositions, which can be dissolved in sterile water or some other sterile injectable medium immediately before use.

The percentage of active ingredient in the compositions of the present invention may be varied, it being necessary that it should constitute a proportion such that a suitable dosage for the desired therapeutic effect shall be obtained. Obviously, several dosage units can be administered at the same time. The preparations of the present invention should preferably be administered so as to give, in the case of oral administration, 20–750 mg. of active substance per day and, in the case of parenteral administration, 20 to 500 mg. of active substance per day.

The following example illustrates the pharmaceutical compositions according to the present invention:

*Example 5*

Tablets (150 mg.) are prepared containing:

| | Mg. |
|---|---|
| Methyl 11-oxo-18β-A-neo-oleana-3,12-diene-30-oate | 50 |
| Starch | 146 |
| Magnesium stearate | 4 |

We claim:
1. A member of the class consisting of derivatives of glycyrrhetinic acid of the general formulae:

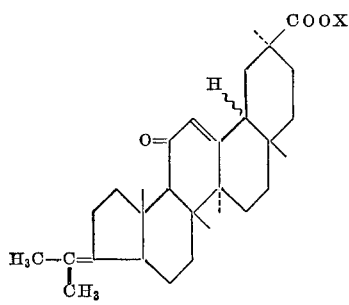

and

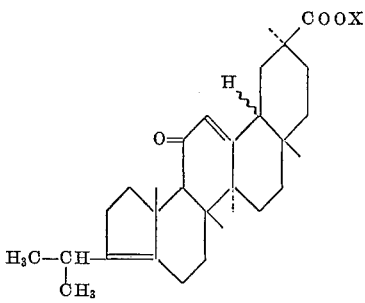

wherein X is a member of the group consisting of hydrogen atoms and alkyl radicals.

2. Methyl 11-oxo-18β-A-neo-oleana-3,12-diene-30-oate of the formula:

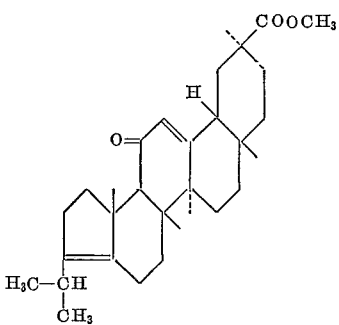

References Cited by the Examiner

Beaton et al.: "J. Chem. Soc. (London)" (1955), pp. 3126–3129.

LORRAINE A. WEINBERGER, *Primary Examiner.*

R. K. JACKSON, *Assistant Examiner.*